United States Patent [19]

Vanderburg et al.

[11] 4,354,663
[45] Oct. 19, 1982

[54] VALVE CONSTRUCTION FOR SAND AND SLURRY SERVICE

[75] Inventors: Ralph W. Vanderburg; Jerome E. Corneillie, both of Longview, Tex.

[73] Assignee: U.S. Industries, Inc., New York, N.Y.

[21] Appl. No.: 126,711

[22] Filed: Mar. 3, 1980

[51] Int. Cl.³ .................. F16K 25/04; F16K 3/00
[52] U.S. Cl. .................... 251/210; 251/327; 251/328
[58] Field of Search ............. 251/327, 328, 326, 210

[56] References Cited

U.S. PATENT DOCUMENTS

| 3,780,982 | 12/1973 | Kemp | 251/210 |
| 4,026,517 | 5/1977 | Still | 251/328 X |
| 4,304,393 | 12/1981 | Malyshev et al. | 251/327 |

FOREIGN PATENT DOCUMENTS

| 877077 | 5/1953 | Fed. Rep. of Germany | 251/327 |
| 2804595 | 8/1979 | Fed. Rep. of Germany | 251/326 |
| 801206 | 5/1936 | France | 251/326 |
| 580394 | 11/1977 | U.S.S.R. | 251/326 |

Primary Examiner—Arnold Rosenthal

[57] ABSTRACT

A gate valve is provided having a recess formed in the upstream portion of the gate and in intersecting relation with the gate port. The gate recess cooperates with a registering recess formed in the downstream portion of the upstream seat to develop a large flow passage as compared to a small flow passage defined by the interrelationship of the gate port with the downstream seat. Fluid laden with erosive material will flow through the larger dimension gate/seat opening between the gate and upstream seat at low velocity, as compared to high velocity flow through the opening defined between the gate and the downstream seat. This low velocity flow, impinging upon the downstream seat, results in minimized erosion of the downstream seat during opening and closing movement of the valve.

7 Claims, 5 Drawing Figures

VALVE CONSTRUCTION FOR SAND AND SLURRY SERVICE

FIELD OF THE INVENTION

This invention relates generally to gate valves such as are utilized for controlling the flow of fluid through a conduit system. More particularly, the present invention is directed to cooperative gate and seat configurations that restrict the velocity of fluid impingement on the downstream seat of the valve during opening and closing movement, thereby minimizing erosive wear of the downstream seat.

BACKGROUND OF THE INVENTION

Typical gate valves are defined by a valve body that is formed to define a valve chamber with a flow passage being defined in the valve body in intersecting relation with the valve chamber. To control the flow of fluid through the flow passages, a gate member is provided having a flow port defined in one portion thereof and a solid blocking portion defined at another portion thereof. The gate member typically reciprocates within the valve chamber between an open position where the flow port is in registry with the flow passage through the valve body and a closed position where the solid blocking portion of the gate blocks the flow of fluid through the flow passage. In order to maintain a sealed relationship between the gate and valve body typically upstream and downstream seat rings are retained within seat pockets defined in the valve body about the flow passage. These seat rings establish sealing engagement with planar sealing surfaces defined at the upstream and downstream portions of the gate.

It is well known in the valve art that movement of a circular gate port relative to circular seat rings develops openings of small dimension between the gate port and seat rings during the initial portion of opening movement and during the terminal portion of closing movement. Under circumstances where these openings are of small dimension, such as during opening and closing, and especially when the valve is in high pressure service and the fluid controlled thereby incorporates a quantity of abrasive medium such as sand, abrasive slurry, line scale, etc., the downstream seat of the valve is likely to become worn to the extent that the sealing capability thereof will fail. Erosion of the downstream seat is due to concentrated impingement of high velocity fluid flowing through the small opening between the upstream seat ring and the gate port. This impinging, high velocity flow of the fluid medium is directed in concentrated relation against a small area portion of the downstream seat. Moreover, each time the valve is cycled, i.e. opened or closed, this high velocity fluid impingement occurs and, within a relatively short period of time, the downstream seat will become eroded and the sealing capability of the valve will deteriorate to the extent that valve repair is required. In many cases, gate valves are manufactured with extremely hard and durable upstream and downstream seat rings in order that erosive failure be retarded as much as possible.

In many cases, the stringent requirements of the service condition to which the valve is to be subjected, dictates that gate valves meet certain rather severe minimum certified standards in order to qualify the valve design for use in the particular intended service. For example, a particular test procedure identified as API-14-D requires that all manufacturers of API-14-D Class 2 valves (wellhead surface safety valves for offshore service) certify one valve at an independent test laboratory. The basic objective of the testing requirements is to qualify the valve design for use in sandy service. The test procedure for certifying the test valve is as follows:

A.

"A sand slurry fluid of two-one-half percent sand is circulated through the test valve with the valve in the fully open position for a fifty hour period. At the end of this fifty hour period, the valve is seat tested and shall have no leakage.

B.

Sand slurry shall be circulated through the valve at a rate of eighty-five gallons per minute while cycling the valve from the open to closed position. Differential pressure across the valve seat will be approximately 400 psi upon each valve closure. Following 500 cycles of operation, the valve shall be seat tested with water and nitrogen and shall have no leakage."

Although the standard test procedure API-14-D is mentioned specifically, it is not to be considered limiting of the scope of this invention.

Sand impingement on the downstream seat of a gate valve is the major cause of seat leakage after 500 cycles of test. During each cycle of operation, the area of opening between the gate and seat changes from the full two-inch opening having an area of 3.14 square inches, to an infinitely small area as the gate approaches the near closed position. The smaller the area of opening, the greater the velocity of fluid flowing through the bore of the valve. Therefore, during each cycle, the velocity of the sand/slurry fluid increases to the extent that sand blasting or erosion of the downstream seat occurs.

THE PRIOR ART

Erosion-induced failure of the sealing capability of valves has been a problem for an extended period of time and illustration of erosive wear activity is depicted in FIG. 1 of U.S. Pat. No. 2,977,975 of Allen. In U.S. Pat. No. 2,977,976 of Allen, protection against erosion of the downstream seat is achieved by providing for rotation of the seat during cycling of the valve mechanism, thereby causing erosion to be evenly distributed about the sealing face of the downstream seat. U.S. Pat. No. 3,871,616 provides a gate member with a movable disc composed of extremely wear-resistant material, and provides arcuate recesses 82 in the gate member for the purpose of releasing pressure actuation of the disc in order to permit opening and closing movement of the gate and disc. Other patents of general interest to the subject matter of this application are U.S. Pat. Nos. 2,982,295 of Williams, 3,433,349 of Leach and 3,906,922 of Leach.

It is desirable, therefore, to provide a gate valve construction wherein erosion of the downstream seat of the valve is minimized.

It is therefore a primary feature of the present invention to provide a novel gate valve construction wherein low velocity fluid impingement occurs against the downstream seat as compared to the velocity of fluid flow through the opening between the downstream seat and gate port, thereby minimizing erosion of the downstream seat by particulate entrained within the flowing fluid medium.

It is a further feature of this invention to provide a novel gate valve construction wherein a modified gate port design is employed which, when cooperating with the upstream seat, develops an opening of greater dimension between the gate port and upstream seat as compared to the dimension of the opening between the gate port and downstream seat.

It is also a feature of this invention to provide a novel gate valve construction wherein the upstream seat and gate are formed to cooperatively develop a fluid flow opening of larger dimension at the upstream portion of the gate port as compared to the dimension of the opening between the gate port and the downstream seat.

Other and further objects, advantages and features of the invention will become obvious to one skilled in the art upon an understanding of the illustrative embodiment about to be described and various advantages, not referred to herein, will occur to one skilled in the art upon employment of the invention in practice.

SUMMARY OF THE INVENTION

In accordance with the present invention, a gate valve mechanism is provided wherein a recess formed in the gate, which recess is in intersecting relation with the gate port, cooperates with the upstream seat of the valve to define a flow path of large dimension therebetween as compared to the dimension of the flow path between the gate and the downstream seat. This large dimension flow path at the upstream side of the gate and seat assembly functions effectively to minimize the velocity of fluid flowing through this flow path and therefore also minimizes the velocity of fluid impingement upon the downstream seat. A portion of the upstream seat that registers with the flow controlling recess of the gate is also formed to define a seat recess that further enhances the physical dimension of the flow path that is defined between the gate and upstream seat, thus further minimizing the velocity of fluid flow through the flow path defined between the gate and upstream seat and thus also minimizing the velocity of fluid impingement against the downstream seat, whereby erosion of the downstream seat is minimized during opening and closing cycling of the valve mechanism.

BRIEF DESCRIPTION OF THE DRAWINGS

In order that the manner in which the above-recited advantages and objects of the invention are attained, as well as others, which will become apparent, can be understood in detail, more particular description of the invention, briefly summarized above, may be had by reference to the specific embodiments thereof that are illustrated in the appended drawings, which drawings form a part of this specification. It is to be understood, however, that the appended drawings illustrate only typical embodiments of the invention and therefore are not to be considered limiting of its scope, for the invention may admit to other equally effective embodiments.

In the Drawings

DETAILED DESCRIPTION OF PREFERRED EMBODIMENTS

Figure 1:
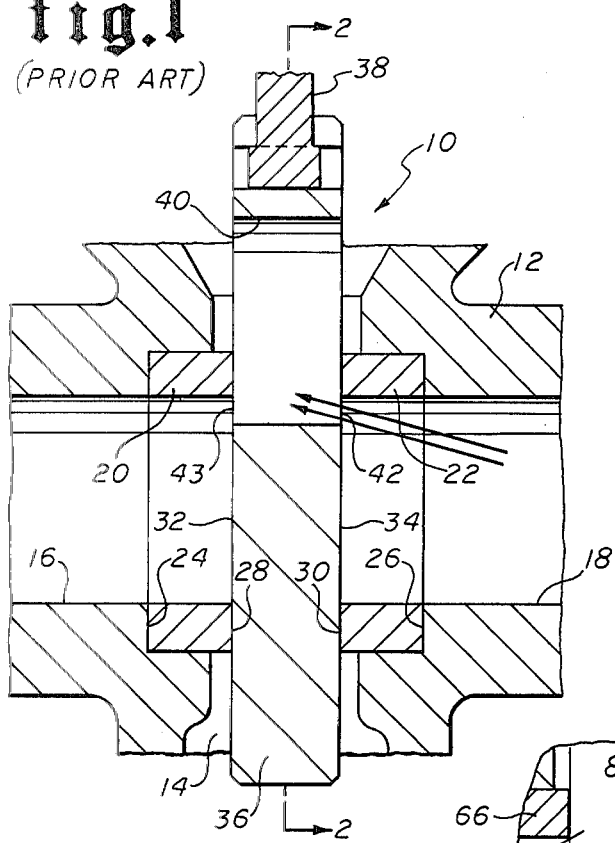
FIG. 1 is a partial sectional view of a gate valve mechanism that is representative of the prior art, with flow past the upstream seat and through the gate port being defined by means of flow arrows, which flow arrows also show the direction of high velocity flow during opening and closing movement of the valve mechanism.
Figure 2:
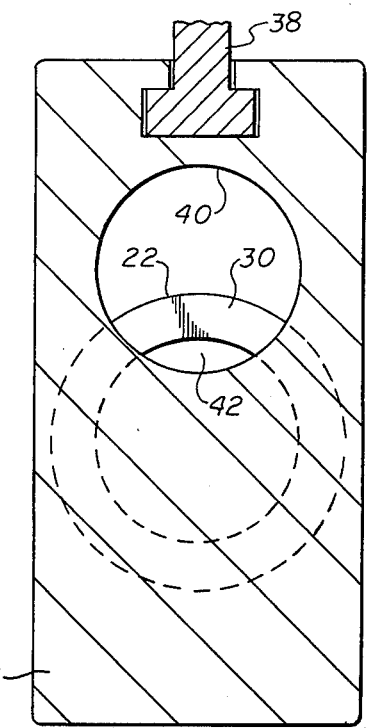
FIG. 2 is a view of the gate and seat relationship of the prior art valve mechanism illustrated in FIG. 1, with the small flow path between the gate and seats being illustrated.

Referring now to the drawings and first to FIGS. 1 and 2, the typical prior art to which this invention is directed, is illustrated by a partial sectional view of a gate valve mechanism illustrated generally at 10 wherein a valve body 12 is provided which defines a valve chamber 14 and flow passages 16 and 18 that intersect the valve chamber. A pair of seat rings 20 and 22 are received within appropriate seat recesses 24 and 26, respectively, that are defined within the valve body. Each of the seat rings provide sealing surfaces 28 and 30, respectively, that establish sealing engagement with planar sealing surfaces 32 and 34 that are formed on a gate member 36. The gate member is reciprocated within the valve chamber 14 by means of a valve stem 38 and a suitable gate operator mechanism, not shown, and positions a gate port 40 in registry with the flow passages 16 and 18 in order to allow flow of fluid through the valve mechanism.

The position of the gate 36 illustrated in FIGS. 1 and 2 is indicative of the problem that is developed during the initial stages of opening movement of the gate and during the terminal stage of closing movement thereof. As shown, the lower portion of the gate port 40 is positioned slightly below the upper portion of the opening in the upstream seat ring 22 thereby developing a flow path 42 of small dimension. A flow path of similar dimension is also defined by the relationship of the gate port 40 with the opening in the downstream seat. As the dimension of the flow path defined by the opening 42 diminishes during closing movement, the velocity of the fluid flowing therethrough increases to high velocity conditions. Flow past the upstream seat through the cooperatively defined opening 42 is therefore of concentrated, high velocity nature and is directed at the upper portion of the downstream seat in the manner shown by the flow arrows in FIG. 1. Under circumstances where the flowing fluid medium contains a quantity of abrasive material such as an abrasive slurry, sand entrained in a liquid or gaseous flowing medium, line scale and other abrasive particulate contained within a flowing fluid, this abrasive particulate is directed at high velocity against a concentrated area portion of the downstream seat. There is developed therefore a jetting activity which causes abrasive blasting or erosion of a concentrated area of the downstream seat.

Since the jetting activity is directed against the upper portion of the sealing face 28 of the downstream seat, erosion of the sealing surface can cause failure of the sealing capability of the valve within a relatively short period of time. Obviously, gate valve mechanisms of this nature are not employed in throttling service for the reason that high velocity jetting of abrasive fluid against the downstream seat will cause rapid erosion and failure of sealing capability within a short period of time. During opening and closing movements, however, a high velocity abrasive jetting activity occurs for a reasonably short period of time, but upon repeated opening and closing movements, with abrasive wear occurring upon each opening and closing cycle, valve failure can occur quite rapidly due to abrasive jetting erosion of the downstream seat.

It is therefore desirable to provide a gate valve mechanism wherein jetting erosion of the downstream seat thereof is minimized during opening and closing cycling. In accordance with the present invention, a valve mechanism providing for minimized jet induced abrasion of the downstream seat assembly may conveniently take the form illustrated in FIGS. 3 and 4 where a gate valve constructed in accordance with this invention is illustrated generally at 50. The gate valve 50 incorporates a valve body structure 52 defining a valve chamber 54 and further defining upstream and downstream flow passages 56 and 58, respectively. The valve body structure 52 is also formed to define upstream and downstream seat recesses 60 and 62 within which are positioned upstream and downstream seat assemblies 64 and 66, respectively. A wave spring 65 is positioned within the upstream seat recess and functions to urge the seat assemblies into continuous contact with the gate member, thus reducing the possibility of abrasive materials becoming wedged between the sealing surfaces of the gate and seats. The seat assemblies 64 and 66 may be defined by simple integral seat rings defining upstream and downstream sealing surfaces 68 and 70, respectively, that are adapted to establish sealing engagement with upstream and downstream planar sealing surfaces 72 and 74 of a gate member 76 that is reciprocated within the valve chamber 54 during opening and closing cycling of the gate member. Movement of the gate member 76 is induced by means of a valve stem 78 that is appropriately moved by any suitable type of valve actuator, not shown, that is interconnected in operative relationship with the valve stem. The gate member 76 is formed to define a flow port 80 which is positioned in registry with the upstream and downstream flow passages 56 and 58 in the open position of the valve, thereby allowing fluid flow through the valve mechanism. The lower portion of the gate defines a solid blocking portion, that is interposed between the valve seats 64 and 66 in order to block the flow of fluid in the closed position of the valve.

It is desirable to provide a structural interrelationship between the gate and the seat assemblies of the valve that functions to minimize the velocity of fluid impingement that is developed against the downstream seat of the valve mechanism during the initial stage of opening movement of the gate and the terminal stage of closing gate movement. This feature is effectively accomplished in accordance with the present invention by forming the upstream portion of the gate 76 to define a gate recess 82 that is in intersecting relation with the generally circular flow port 80. The gate recess 82 may be of generally rectangular configuration in the manner illustrated particularly in FIG. 4, although the recess may take any other suitable form without departing from the spirit and scope of this invention. It is intended to define a flow passage of greater dimension between the gate and upstream seat as compared to the dimension of the flow path defined between the downstream portion of the gate and the downstream seat. By forming the recess 82 in the upstream portion of the gate, the recess 82 cooperates with the upper portion of the upstream seat 64 to define a flow path A of quite large dimension. The flow path B defined between the downstream portion of the gate and the upper portion of the downstream seat 66 is of similar dimension as shown at 42 in FIG. 2, thereby being of much smaller dimension as compared to the flow path defined by the relationship of the gate recess 82 with the upstream seat. By virtue of the larger dimension of flow path A, the velocity of fluid flowing through this upstream flow path is minimized as compared to high velocity flow through flow path B. By virtue of the lower velocity flow of fluid through flow path A, there is low velocity impingement of the flowing fluid against the sealing face 70 of the downstream seat. Moreover, this low velocity flow of fluid medium is directed against a much larger area of the downstream seat as compared to the concentrated relationship of the jetting action that occurs in prior art devices as illustrated in FIGS. 1 and 2.

Figure 5:
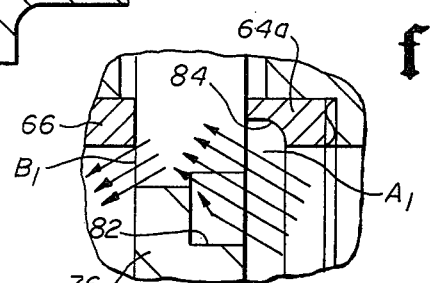
FIG. 5 is a fragmentary sectional view of a gate valve mechanism representing a modified embodiment of this invention and showing registering recesses defined in the upstream portion of the gate and downstream portion of the upstream seat, which recesses cooperate to define a flow passage of large dimension therebetween.
Figure 3:
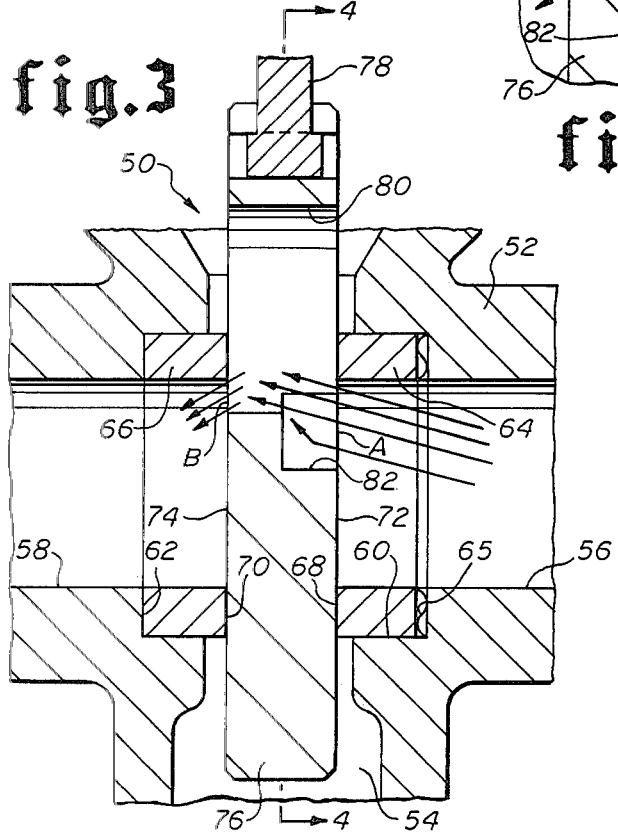
FIG. 3 is a partial sectional view of a gate valve mechanism constructed in accordance with the present invention and showing the gate being positioned in the partially closed position, with flow arrows defining low velocity flow past the upstream seat.
Figure 4:
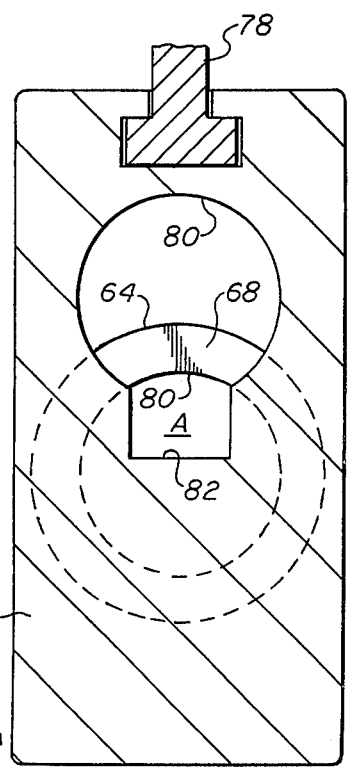
FIG. 4 is a sectional view taken along line 4—4 of FIG. 3 and illustrating the large dimension flow path that is defined between the upstream portion of the gate and upstream seat at the partially open position of the gate.

In the event it is desirable to provide further increase in the dimension of the flow path between the upstream portion of the gate and the downstream portion of the upstream seat, the present invention may conveniently take the form illustrated in the fragmentary sectional view of FIG. 5 wherein the valve body, gate and downstream seat constructions may be substantially identical as compared with the construction illustrated in FIG. 3. To provide the additional flow path area, the upper, downstream portion of the upstream seat 64a may be formed to define a radial recess 84 having a configuration similar to a counterbore that is positioned in registry with the recess 82 of the gate 76. When the gate member 76 is initiating its opening movement or terminating its closing movement, a relatively small flow path $B^1$ is developed between the downstream portion of the gate port and the downstream seat member 66. Simultaneously, a flow path $A^1$ of much larger dimension is developed by the cooperative relationship of the gate recess 82 and the seat recess 84. Since the small dimensioned downstream opening $B^1$ provides a restriction to fluid flow, the same volume of fluid must flow through the larger dimensioned flow path $A^1$. By reducing the flow of fluid through the flow path $A^1$ to a restricted volume, due to the restriction of the flow path $B^1$, the resulting flow through the larger dimensioned opening $A^1$ will be minimized and will be of much lower velocity as compared to the velocity of flow through flow path $B^1$. The result is that lower velocity impingement of fluid flow will occur against the sealing face of the downstream seat 66 and therefore erosion of the downstream seat by any erosive medium contained within the flowing fluid will be effectively minimized.

It is therefore apparent that the present invention is one well adapted to attain all of the objects and advantages hereinabove set forth, together with other advantages which will become obvious and inherent from a description of the method and apparatus itself. It will be understood that certain combinations and subcombinations are of utility and may be employed without reference to other features and subcombinations. This is contemplated by and is within the scope of the present invention.

As many possible embodiments may be made of this invention without departing from the spirit or scope thereof, it is to be understood that all matters hereinabove set forth or shown in the accompanying drawings are to be interpreted as illustrative and not in any limiting sense.

What is claimed is:

1. In a gate valve wherein a ported gate element having a generally circular gate port is movable between circular valve seats positioned within a valve chamber to control the flow of fluid through flow passages defined by the valve, the improvement comprising:

said gate port and the upstream one of the valve seats being of cooperative configuration at the initial stage of opening movement of said gate and at the terminal stage of closing movement of said gate to define an upstream flow path of greater dimension as compared to the flow path established by the relationship of the gate portion and the downstream seat, whereby the velocity of fluid flowing through the upstream flow path and impinging upon the downstream seat will be of lower velocity as compared to the velocity of flow through the downstream flow path, thereby minimizing erosion of the downstream seat by erosive particulate entrained within the flowing fluid.

2. The improvement recited in claim 1, wherein:

the upstream portion of said gate being formed to define a gate recess cooperating with said upstream seat to define said greater dimensioned upstream flow path.

3. The improvement recited in claim 2, wherein:

said gate recess is of generally rectangular configuration, extends partially through said gate and intersects the upstream planar sealing surface of said gate.

4. The improvement recited in claim 1, wherein:

said upstream valve seat is formed to define a counterbored seat recess.

5. The improvement recited in claim 4, wherein:

said seat recess intersects the downstream side of the upstream seat and further intersects the flow opening defined by said upstream seat.

6. The improvement recited in claim 1, wherein:

the upstream portion of said gate is formed to define a gate recess that intersects said gate port, said gate recess cooperating with said upstream seat to define said greater dimensioned upstream flow path; and said upstream valve seat is formed to define a seat recess.

7. The improvement recited in claim 6, wherein:

said gate recess is of generally rectangular configuration, extends partially through said gate and intersects the upstream planar sealing surface of said gate; and said seat recess intersects the downstream side of the upstream seat and further intersects the flow opening defined by said upstream seat.

* * * * *